United States Patent [19]
Voshel

[11] 3,844,708
[45] Oct. 29, 1974

[54] OVEN CONVEYOR AND METHOD
[75] Inventor: Gerald Lee Voshel, Kentwood, Mich.
[73] Assignee: Werner Lehara, Inc., Grand Rapids, Mich.
[22] Filed: Jan. 23, 1974
[21] Appl. No.: 435,657

Related U.S. Application Data
[62] Division of Ser. No. 343,112, March 20, 1973.

[52] U.S. Cl.................. 432/11, 426/520, 432/137
[51] Int. Cl.............................................. F27b 9/24
[58] Field of Search ............... 432/2, 5, 11, 137; 426/520

[56] References Cited
UNITED STATES PATENTS
1,435,975  11/1922  Petersen ..................... 432/137
3,071,065  1/1963  Macy et al. .................. 426/520
3,733,173  5/1973  Scapo et al. .................. 432/5

*Primary Examiner*—John J. Camby
*Attorney, Agent, or Firm*—Price, Heneveld, Huizenga & Cooper

[57] ABSTRACT

A normally flat, flexible conveyor band is moved endlessly through a baking oven and conforms to the shape of a support in the oven which configurates the band in a continuous downward direction from its lateral midpoint to each edge. A drain trough extends beneath each edge to catch cooking fluids produced during baking. The troughs are sloped toward a discharge outlet for removal of the fluids from the oven. At the outlet of the oven, the band resiliently resumes its flat configuration until its re-entry into the oven along its endless travel.

4 Claims, 4 Drawing Figures

PATENTED OCT 29 1974 3,844,708

OVEN CONVEYOR AND METHOD

CROSS REFERENCE TO RELATED APPLICATION

This is a division of application Ser. No. 343,122, filed Mar. 20, 1973, and entitled OVEN CONVEYOR AND METHOD.

BACKGROUND OF THE INVENTION

This invention relates to commercial baking ovens and more particularly to a unique method and conveyor which removes fluids produced during baking.

In baking certain types of foods in mass quantities, the food is placed in measured quantities directly on top of a conveyor band which moves endlessly through the oven. This has proven to be an economical approach to baking such types of foods as pet foods comprising chunks or patties of relatively small sizes. A principal drawback experienced with existing conveyors is the lack of adequate means for removing the baking fluids from the band as they are produced. Failure to do so results in the building up of grease deposits on the band which causes the foods to be partially deep fried instead of baked.

A known method for removing such fluids is to provide a perforated band with catch pans positioned therebeneath so that the fluids, as they are produced, drop through the band onto the catch pan which is tilted or otherwise provided with means for removing the grease. While this may be satisfactory in certain installations, with regard to certain types of food, the quality of the baking in large installations of the type envisioned herein depends upon a uniform circulatory flow of heated air above and below the band at a controlled selected temperature differential. A perforated band renders a controlled temperature differential extremely difficult to maintain and in addition is costly. Also, the provision of a catch pan extending the width of the band and the length thereof as it passes through the oven is quite costly. Of equal importance, the catch pan positioned beneath the band disrupts the flow of circulatory air preventing uniform baking. Yet another drawback to such a system is the increased fire hazard resulting from collecting the grease in quantity immediately beneath the conveyor band which will generally position it in close proximity to the source of energy utilized to heat the oven which source is generally an open flame.

Thus, a need exists in this art for an improved method and apparatus for draining and removing cooking fluids in a way that is more expedient, safe, and economical.

SUMMARY OF THE INVENTION

In accordance with the invention, the unbaked food is deposited in measured quantities on an endless conveyor means comprising a normally flat flexible band. The band conforms to a configurated support means provided within the oven which provides a downward deflection of the band from its lateral midpoint toward each of its edges to drain baking fluids to each edge. Inclined trough means are provided beneath each edge to catch the fluid discharges and direct them toward a discharge conduit for removing the fluids from the oven.

In narrower aspects of the invention, the outer edges of the band are supported by a shield means interconnected to the support means and the troughs are supported along one longitudinal edge by the walls of the oven while the opposite edges are supported by the support means. The combination of the conveyor band, shields and troughs form a heat seal permitting the maintenance of a temperature differential between the regions immediately above and beneath the conveyor band.

A principal advantage of the invention is the immediate draining of the fluids produced during baking to each side of the conveyor and collection in a trough therebeneath. The inclination of the trough provides immediate drainage to a discharge conduit for complete removal from the oven. The drainage of the fluids to each side of the conveyor reduces the potential fire hazards by removing them from the immediate locus of heat source. It is extremely more economical to slightly configurate the band by the provision of configurated support means rather than perforate the band and provide a catch pan beneath the entire area of the band. Of additional importance, as a result of the invention, it is possible to provide and maintain a temperature differential between the regions of heated air above and below the band. An additional feature of the invention is the capability of discharging all of the fluids collected through a single conduit means thereby piercing the insulation of the oven at a single location. This has not heretofore been possible. The provision of a simplified trough also makes the entire installation extremely easy to clean thereby reducing overall costs.

DESCRIPTION OF THE PREFERRED EMBODIMENTS

Figure 1:
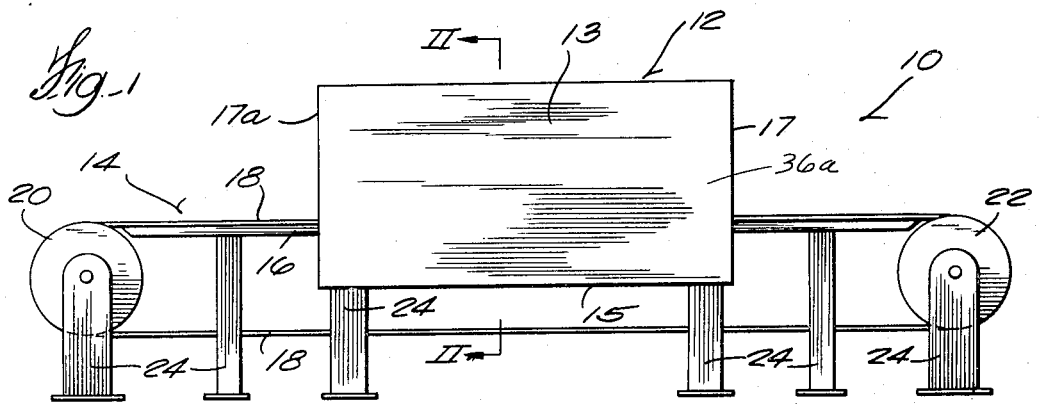
FIG. 1 is a side elevation of the baking apparatus and conveyor, showing general features thereof.

Referring now to the drawings in detail, and particularly to FIG. 1, the present invention provides an apparatus 10 for baking which is particularly suited to commercial operations on a mass production basis. As an example only, the invention is particularly suited to baking in mass quantity a plurality of measured amounts of foods such as pet food cooked and packaged as a number of chunks or patties of relatively small size. The concept, however, is applicable to a wide variety of different types of baked goods.

The novel baking apparatus 10 comprises generally an oven means 12 and a conveying means 14 tracing a closed path through the oven. Conveying means 14 includes a substantially horizontal bed or table portion 16 exteriorly of the oven for supporting an endless movable conveyor band 18 which, as described in more detail hereinafter, is preferably a flexible steel band. Band 18 is entrained at each end about suitable rollers 20 and 22 whereby the band enters the oven 12, passes through and out of the same, and returns to enter the oven once again. It will be appreciated that this system of band entrainment and return is merely illustrative, and that other specific systems may be utilized if so desired.

The oven, bed, and rollers are all suported above the floor by appropriate structure such as, for example, various support legs 24 illustrated in FIG. 1. The oven itself is basically enclosed having a top 13, bottom 15, end walls 17, 17a and side walls 36, 36a. Appropriate openings through end walls 17, 17a permit passage of the conveyor band and articles carried thereon. Suitable insulation curtains (not shown) are provided in order to insulate the oven as much as possible. The oven means 12 is basically a conventional unit incorporating means for supplying the desired baking temperatures and having an actual physical size which may vary in accordance with the particular baking operation to be performed. The oven configuration is readily understood by one skilled in the baking arts and consequently specific details are not deemed necessary.

A principal feature of the present invention lies in the precise nature of conveyor means, and the manner in which the flexible band 18 passes through oven means 12. Exterior of the oven means 12, band 18 has a cross-sectional configuration that is essentially flat whether it is traveling on the upper work carrying path or lower return path.

Figure 2:
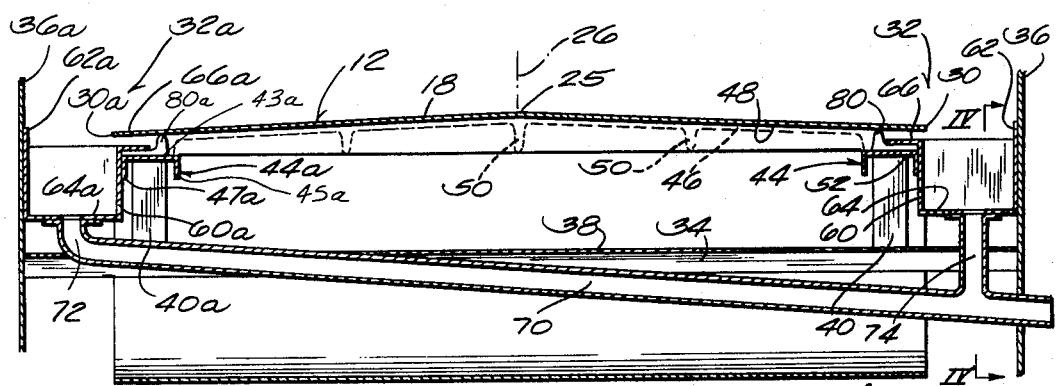
FIG. 2 is a fragmentary sectional view taken generally through the transverse plane II—II of FIG. 1, showing specific features of the invention.

As the conveyor band moves from the exterior location of the oven means to within the oven itself, it becomes configured into a generally convex configuration as illustrated in FIG. 2 which is an enlarged fragmentary cross section taken generally along the transverse plane II—II of FIG. 1.

Referring in detail to FIG. 2, the apex 25 of the generally convex shape is positioned at the lateral center of band 18, the center being indicated by reference numeral 26 in FIG. 2.

The convex shape of band 18 within oven means 12 causes fluids produced during baking to drain to each side of band 18 until they fall off the lateral edges 30, 30a. Troughs 32, 32a are positioned beneath each edge 30, 30a to catch the fluids and direct them for removal from the oven means as will be described in more detail hereinafter.

Figure 3:
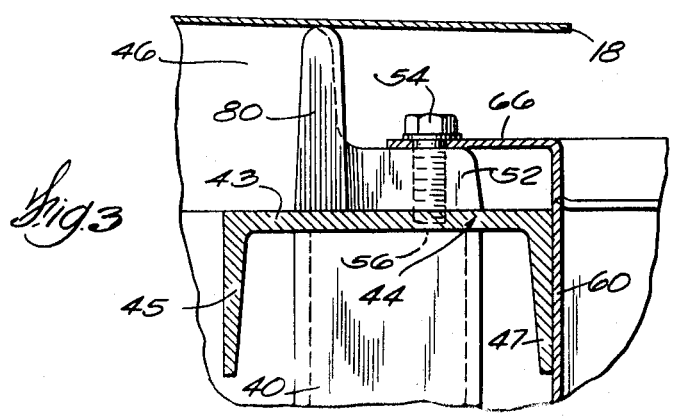
FIG. 3 is an enlarged fragmentary view in cross section of the band support and seal provided by the invention.

A plurality of longitudinally spaced cross beams 34 are interconnected and anchored to each of the spaced side walls 36, 36a as illustrated in FIG. 2. A tubular channel member is adequate for this purpose having an upper wall or web portion 38 extending the width of the oven means. A plurality of risers 40, 40a (FIGS. 2 and 3) are anchored to cross members 34 and extend generally vertically upwardly. Two risers are anchored on each cross member, each of which are spaced inwardly from the side wall a distance slightly larger than the width of trough 32. A pair of longitudinally extending channel supports 44, 44a are secured to each row of risers 40, 40a and extend continuously the length of oven means 12. The channel suports 44, 44a are preferably C-shaped as shown in FIG. 3 and comprise a web portion 43, 43a and spaced legs 45, 45a and 47, 47a.

A plurality of transverse configurated support means 46 are anchored at each end respectively to one of the continuous channel supports 44, 44a and spaced longitudinally to provide a configurated support for band 18. The upper surface 48 (FIG. 2) of each transverse support 46 has a shape which is either contoured or sloped downwardly toward each end from its centered apex 25. The flexible nature of band 18 causes it to conform to the configuration of supports 46 so that the band also hs a downwardly inclined configuration from its lateral midpoint. It is this slope which causes the cooking fluids produced during baking to flow toward each edge of band 18. The slope or radius of curvature of upper surface 48 of transverse supports 46 is preferably steep enough to provide for immediate drainage of the fluids and yet shallow enough so that the goods positioned thereon do not likewise move by their gravitational weight off the band. It will be appreciated that in many instances, the food chunks being baked are not necessarily flat and in fact, become less so through cooking. Thus, a relatively shallow slope between about 1° to 4° is preferred and it has been found in the case of cooking pet foods comprising chunks or small patties that a 2°–3° slope is preferred. The more surface contact area of the food, however, permits a greater angle of inclination.

Transverse support 46 includes a plurality of laterally spaced ribs 50 which provide added strength in supporting the foods being conveyed and carried on band 18. The outer ends of each transverse support 46 include anchoring lobes or shoulders 52 (FIG. 3) through which a threaded fastener 54 is positioned and threaded into appropriately positioned taps 56 in channels 44. Thus, each transverse support 46 is positively fastened at each end to a longitudinal channel 44.

Turning to the drain trough configuration, drain troughs 32, 32a are comprised of a lightweight thin-walled material shaped into a generally U-shape configuration having a pair of side walls 60, 60a and 62, 62a interconnected by the bottom wall 64, 64a. The outer side walls 62, 62a are preferably attached to the side walls 36, 36a of oven means 12 by a fastener or other conventional means while the interior sides 60, 60a are attached directly to risers 40 and the outer legs 47, 47a of channel supports 44, 44a by mechanical fasteners 54 at the locus of transverse support bars 46.

In the preferred embodiment, the upper ends of side walls 60 and 60a are flared or bent beneath band 18 forming a lip 66, 66a having an appropriate aperture alignable for insertion of fastener 54. Trough 32 extends continuously the length of oven means 12 although it can be fabricated in arbitrary sections which are in endwise abutment for form a continuous trough. Trough 32 is positioned so that the lateral edges 30, 30a of band 18 extend at least to the inner walls 60, 60a of each trough so that all of the drainage from band 18 is captured in the troughs.

The flat bottoms 64, 64a of troughs 32, 32a greatly facilitate cleaning and are preferred for that reason. However, other configurations would work equally well such as a V-shaped trough. Alternative illustrations are not shown or described in detail since they would be obvious to one skilled in the art.

Figure 4:
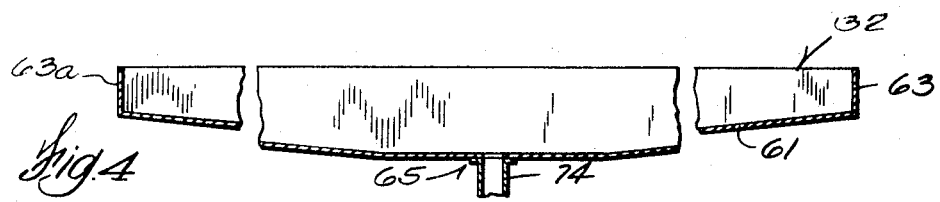
FIG. 4 is a reduced fragmentary cross-sectional view taken through the transverse plane III—III of FIG. 1, showing further specific details of the invention.

Referring now to FIG. 2, the interior portion of the oven is illustrated to show a specific feature of the drainage system provided by the pair of troughs 32, 32a. In the preferred embodiment, each of the troughs 32, 32a are preferably sloped downwardly and inwardly from each end 63, 63a (FIG. 4) meeting at the longitudinal midpoint 65 thereof. Ends 63, 63a are generally aligned with ends 17, 17a of the oven. One way of obtaining the slopes of each trough is to simply incline the entire trough. However, in the preferred embodiment, the depth of bottom 64 varies vertically from a minimum at each end 63, 63a (FIG. 4) to a maximum depth at its longitudinal midpoint 65.

By sloping each of the troughs 32, 32a inwardly and downwardly from each outer end, the entire fluid run off from each trough is collected at one location, the longitudinal center of each trough. A removal conduit 70 collects the drainage from each trough through branches 72 and 74 for removal from the oven through one of the enclosing walls such as side wall 36. In this fashion, only one penetration of the insulation of the oven is required to remove the fluids from the oven.

Referring now back to FIGS. 2 and 3, a pair of band seals 80 and 80a are interposed between band 18 and channels 44, 44a respectively along and beneath each lateral edge of band 18. The seal is preferably comprised of a casting member of selected lengths interposed between each transverse support 46, 46a. The band seal along with band 18 and troughs 32 and 32a provide a thermal seal between the heated regions of air above and beneath band 18. Thus, a temperature differential between these regions can be maintained which differential is highly desired in certain applications.

Based on the foregoing, the method and operation of the described oven apparatus should be obvious. Referring to FIG. 1, the food is deposited on band 18 for movement through oven means 12 in order to bake the food. As the band enters oven 12, it assumes the configuration of surface 48 of supports 46 causing fluids produced by baking to drain to each side of band 18 as a result of its generally convex cross-sectional configuration. This prevents deep frying of the foods in their collected fluids and permits true baking. The drippings are caught in troughs 32 or 32a and as a result of the slope of the troughs, the drippings are directed to drainage branches 72 and 74 of the discharge tube 70 which removes the grease from the oven area. Once the band leaves the oven, it assumes its generally flat shape again.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodients of the invention in which an exclusive property or privilege is claimed are defined as follows.

1. A method of baking particularly suited to commercial-type operations, said method comprising the steps of: providing an oven means for supplying baking heat; providing a normally flat conveyor band and arranging it to pass continuously through said oven means; temporarily deforming said normally flat band as it passes through said oven means whereby said normally flat band has a generally convex configuration for draining fluids produced during baking to each lateral edge of said band; providing means for catching said fluids from said band and removing said foods from said oven means; and placing uncooked foods upon said band and moving said band through said oven means for baking said foods.

2. The method according to claim 1 wherein configurated support means are provided in said oven means for supporting said band, said configurated support means having a generally convex support surface, said normally flat band conforming to the shape of said support surface.

3. The method according to claim 1 wherein said means provided for catching said fluids from said bands includes a trough means positioned beneath each edge of said band and extending the length of said oven means, said trough each including at least one discharge opening along the bottom of said trough, said troughs being sloped toward said discharge openings for removing said fluids from said oven means.

4. The method according to claim 1 wherein said generally convex configuration of said band has a slope of about 1° to 4° relative the horizontal.

* * * * *